US012172461B2

(12) United States Patent
Nam

(10) Patent No.: US 12,172,461 B2
(45) Date of Patent: Dec. 24, 2024

(54) METAL DECORATION MANUFACTURING METHOD

(71) Applicant: Kilwan Nam, Seoul (KR)

(72) Inventor: Kilwan Nam, Seoul (KR)

( * ) Notice: Subject to any disclaimer, the term of this patent is extended or adjusted under 35 U.S.C. 154(b) by 0 days.

(21) Appl. No.: 18/321,941

(22) Filed: May 23, 2023

(65) Prior Publication Data

US 2024/0336085 A1 Oct. 10, 2024

(30) Foreign Application Priority Data

Apr. 4, 2023 (KR) ........................ 10-2023-0043982
Apr. 28, 2023 (KR) ........................ 10-2023-0055895

(51) Int. Cl.
*B44C 5/04* (2006.01)

(52) U.S. Cl.
CPC .................................. *B44C 5/0415* (2013.01)

(58) Field of Classification Search
CPC ..... B44C 5/0415; B29C 43/00; B29C 43/021; B29C 59/022; B31F 1/07; A43D 25/185; B81C 2201/015
See application file for complete search history.

(56) References Cited

FOREIGN PATENT DOCUMENTS

| | | | | |
|---|---|---|---|---|
| CN | 112549429 | A | * | 3/2021 |
| CN | 114474225 | A | * | 5/2022 |
| CN | 217919326 | U | * | 11/2022 |
| JP | H03-071814 | A | | 3/1991 |
| JP | H04-092000 | A | | 3/1992 |
| JP | 2003-159753 | A | | 6/2003 |
| KR | 101388626 | B1 | * | 4/2014 |
| KR | 20-0483961 | Y1 | | 7/2017 |

OTHER PUBLICATIONS

Li M; CN-217919326-U; Machine Translation (Year: 2022).*
Guo X; CN-114474225-A; Machine Translation (Year: 2022).*
Sun Jong Jae; KR-101388626-B1; Machine Translation (Year: 2014).*

* cited by examiner

*Primary Examiner* — Lee A Holly
(74) *Attorney, Agent, or Firm* — KORUS Patent, LLC; Seong Il Jeong

(57) ABSTRACT

The present invention provides an innovative manufacturing method by which a module configured to represent one or more characters or letters is manufactured in an integrated form and the successive characters or letters can be imprinted on a final product by simply separating the module having the successive characters or letters or using the module having the successive characters or letters without change.

2 Claims, 10 Drawing Sheets

METAL DECORATION MANUFACTURING METHOD

CROSS-REFERENCE TO RELATED APPLICATION

This application claims the benefit of Korean Patent Application No. 10-2023-0055895 filed on Apr. 28, 2023, which is hereby incorporated by reference herein in its entirety.

BACKGROUND

1. Technical Field

The present invention relates to a metal decoration manufacturing method.

2. Description of the Related Art

In general, metal decorations such as the brand of a product and the logo of a manufacturer are imprinted on the surfaces of various products such as clothes, wallets, or bags made of fiber or leather.

Metal decorations are traditionally fixed by a method using an adhesive. Alternatively, there is a method of plating one or more letters or shapes constituting a metal decoration. Korean Utility Model Registration No. 20-0483961 discloses the technology of plating each letter using a unit imprinting body. Korean Patent No. 10-1388626 discloses a process of modularizing a group of letters in an integrated form and subjecting the modularized letters to a corrosion step, a bending step, a punching step, and an insertion step.

However, these prior arts have problems in that accuracy is deteriorated and work efficiency is significantly reduced because a decorative body needs to be separated and attached for each letter or shape in a final process.

The present invention was devised to overcome the above problems of the prior arts.

SUMMARY

An object of the present invention is to provide a manufacturing method capable of easily manufacturing a metal decoration on which at least two letters, shapes, or symbols are successively imprinted, a metal decoration manufactured by the method, and a manufacturing tool and device.

In order to achieve the above object, the present invention provides an innovative manufacturing method by which a module configured to represent one or more characters or letters is manufactured in an integrated form and the successive characters or letters can be imprinted on a final product by simply separating the module having the successive characters or letters or using the module having the successive characters or letters without change.

More specifically, according to an aspect of the present invention, there is provided a metal decoration manufacturing method including: manufacturing a protocol decoration through an injection process; providing a base decoration by removing unnecessary portions from the protocol decoration; plating the base decoration; and integrating the logo of the base decoration with a plate by coupling the logo of the base decoration to the plate through a coupling process; wherein the logo includes at least two letters or shapes, and the at least two letters or shapes are simultaneously coupled to the plate.

The plate may include a logo accommodation portion configured to accommodate the logo of the base decoration.

One or more pins may be formed on the rear surface of the logo of the base decoration.

The metal decoration manufacturing method may further include imprinting and fixing the logo of the plate, to which the logo is coupled, onto a final fixation target material through a final imprinting process.

The base decoration may include a first base decoration and a second base decoration, the logo may include the first logo of the first base decoration and the second logo of the second base decoration, and the logo accommodation portion of the plate may include a first logo accommodation portion to which the first logo is coupled and a second logo accommodation portion to which the second logo is coupled.

The coupling process may be performed by a press machine, the press machine may include an upper press part and a lower worktable, and one or more pin holes configured to accommodate the pins of the logo may be formed in a pressing portion on the bottom surface of the pressing portion.

According to another aspect of the present invention, there is provided a plate used to fabricate a metal decoration, wherein the plate is configured to fix the logo of a base decoration separated from a protocol decoration manufactured through an injection process, the logo includes at least two letters or shapes, and the plate is provided with a logo accommodation portion configured to accommodate the logo.

According to still another aspect of the present invention, there is provided a press machine used to manufacture a metal decoration, wherein the press machine includes an upper press part configured to press a plate to which the logo of a base decoration separated from a protocol decoration fabricated through an injection process is fixed and a lower worktable configured such that the plate is mounted thereon, one or more pins are formed on the rear surface of the logo of the base decoration, and one or more pin holes configured to accommodate the logo pins are formed through a bottom surface of the press part.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Hereinafter, preferred embodiments of the present invention will be described with reference to the accompanying drawings.

First, the individual steps of a metal decoration manufacturing method according to the present invention will be described according to the sequence of a process.

Figure 2:
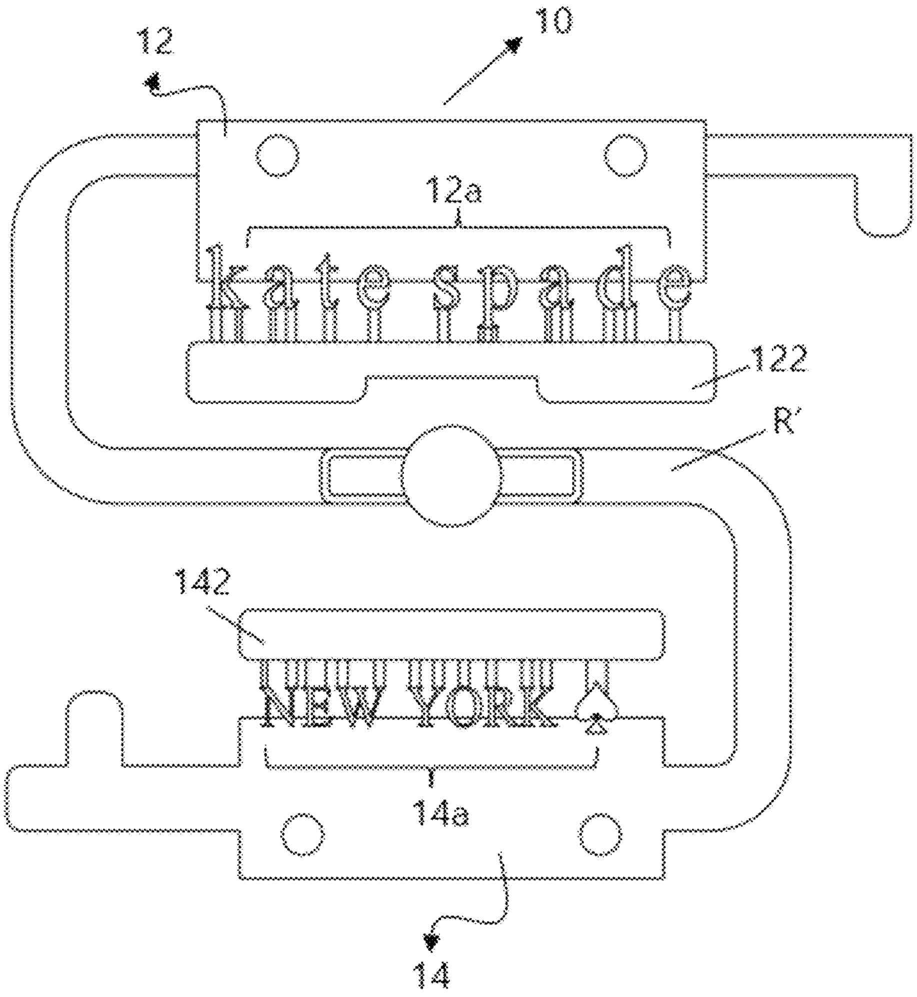
FIG. 2 shows a protocol decoration that is injection-molded to manufacture a metal decoration according to the present invention.

FIG. 2 shows a protocol decoration 10 that is injection-molded to manufacture a metal decoration according to the present invention. The injection molding is designed to manufacture a product by injecting a plastic or metal material into a mold having a predetermined shape. However, the protocol decoration 10 is not limited to injection molding, and may be manufactured by a punching, pressing, cutting or machining process or by combining one or more of these processes with injection molding. Hereinafter, the following description will be given on the assumption that the protocol decoration 10 is injection-molded.

In the case where the protocol decoration 10 is injection-molded, the protocol decoration 10 is molded into an integrated product in which a first base decoration 12 and a second base decoration 14 are connected by a runner R', as shown in the drawing.

The base decorations each include a logo to be imprinted on a final product such as a handbag. The first logo 12*a* of the first base decoration 12 is three-dimensional (3D) letters of "kate spade." The second logo 14*a* of the second base decoration 14 is a combination of 3D letters of "NEW YORK" and a spade shape. These logos are only examples. In the present invention, the "logo" may include any trademark, trade name, product name, country of origin, and a verification or certification mark. In addition, the logo includes one or more letters, shapes, symbols, colors and/or the combination thereof, and is not particularly limited to any type of elements.

The first base decoration 12 and the second base decoration 14 are rectangular flat plates, but are not limited thereto. The first logo 12*a* is formed on the lower portion of the first base decoration 12, and an injection bridge 122 formed in an injection molding process is attached to the protruding lower portion of the first logo 12*a*. The second logo 14*a* is formed on the upper portion of the second base decoration 14, and an injection bridge 142 formed in the injection molding process is attached to the protruding upper portion of the second logo 14*a*.

Figure 3A:
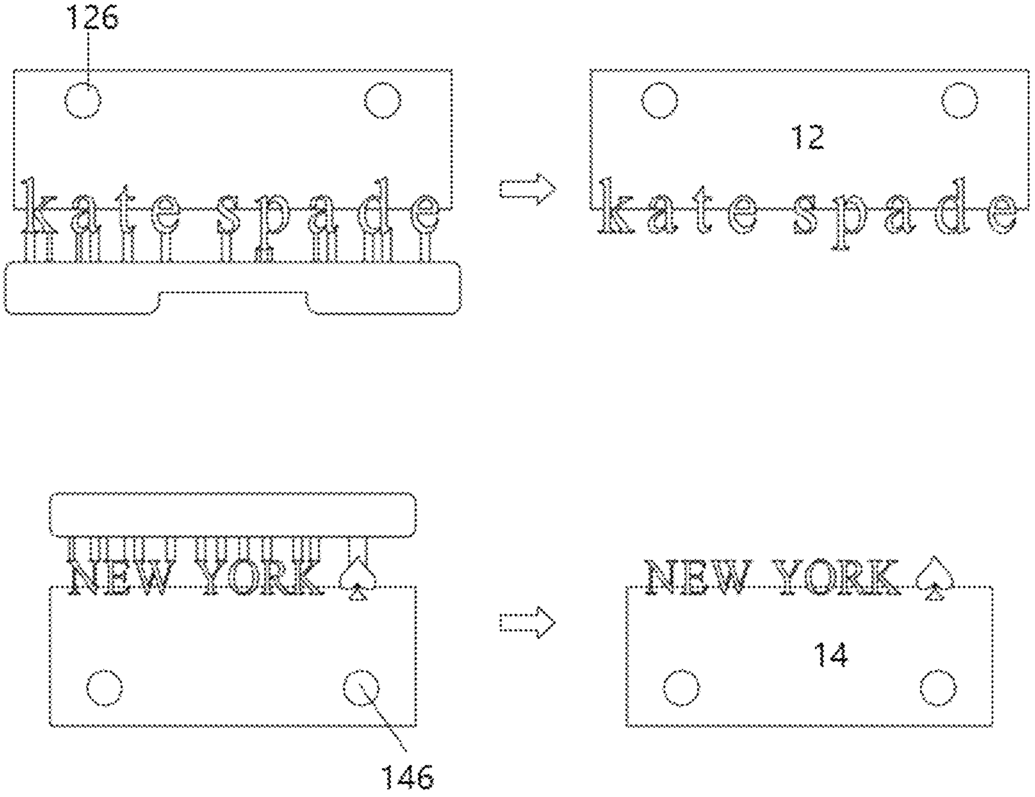
FIG. 3A shows a state in which a first base decoration and a second base decoration have been separated and removed from a protocol decoration and unnecessary injection bridges have been removed.

FIG. 3A shows a state in which the first base decoration 12 and the second base decoration 14 have been separated and removed from the protocol decoration 10 and unnecessary injection bridges 122 and 142 have been removed. First holes 126 are formed on both sides of the upper portion of the first base decoration 12, and second holes 146 are formed on both sides of the lower portion of the second base decoration 14.

Figure 3B:
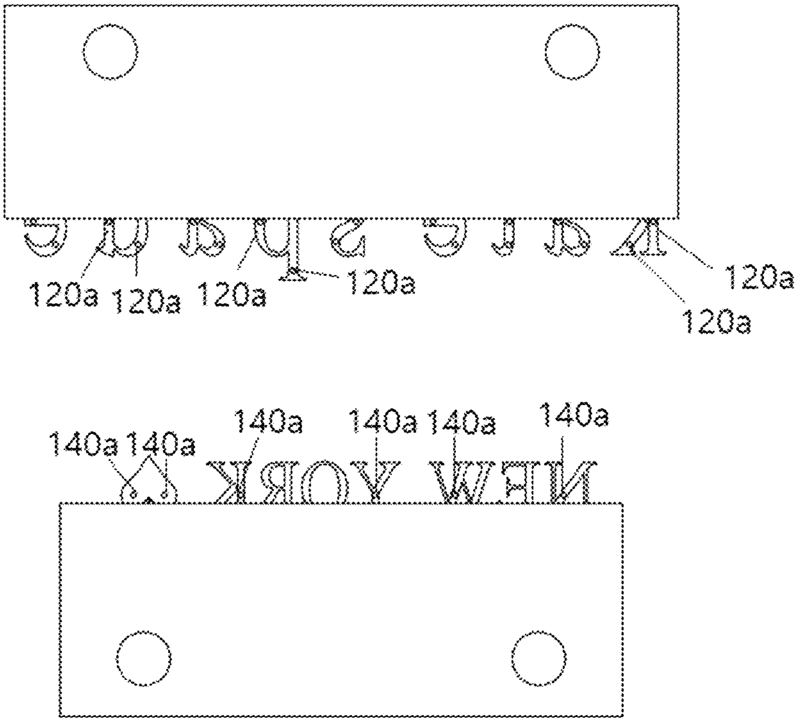
FIG. 3*b* shows views illustrating the rear surfaces of the first base decoration and the second base decoration from which the injection bridges have been removed in FIG. 3A.

FIG. 3*b* shows views illustrating the rear surfaces of the first base decoration 12 and the second base decoration 14 from which the injection bridges 122 and 124 have been removed in FIG. 3A.

Long or short first pins 120*a* are formed on the rear surface of the first logo 12*a* of the first base decoration 12. A total of 18 first pins are formed for 9 letters by arranging long and short pins in a set for each of the letters constituting the first logo 12*a*. Similarly, long or short second pins 140*a* are formed on the rear surface of the second logo 14*a* of the second base decoration 14. A total of 6 second pins 140*a* are arranged at appropriate locations at intervals. This is performed by taking into consideration the size and overall balance of the second logo 14*a*. That is, the size, number and arrangement of the pins 120*a* or 140*a* are appropriately changed by taking into consideration the size, weight and balance of the corresponding logo, and the illustrated embodiment is merely an example.

It is obvious that the first and second pins 120*a* and 140*a* have been already formed on the protocol decoration 10 of FIG. 2.

In the metal decoration manufacturing method of the present invention, a plating process is performed on the first base decoration 12 and second base decoration 14 of FIG. 3. Any of electroplating, electroless plating, vacuum plating, electrodeposition coating, and the like may be used as the plating process. The plating process may be performed not only on the separated decorations of FIG. 3 but also on the integrated protocol decoration 10, and the sequential positon of the plating process does not limit the scope of the present invention. The plated base decorations have beautiful appearances each having a metallic luster.

Thereafter, in the present invention, a plate 4 is used as a member for intermediately imprinting or transplanting a base decoration(s).

Figure 4A:
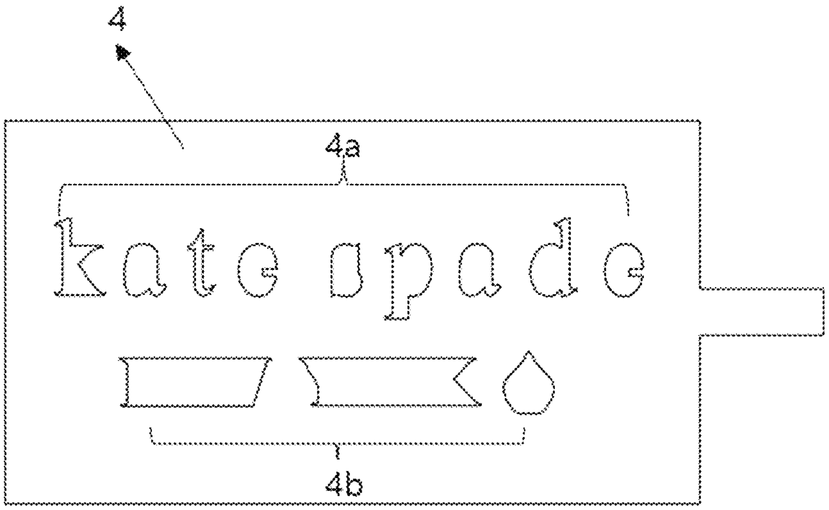
FIG. 4A shows a plate for coupling with the base decorations of FIG. 3.

FIG. 4A shows the plate 4 for coupling with the base decorations of FIG. 3. The plate 4 is manufactured in a rectangular shape as a whole, but is not limited thereto.

The plate 4 has a first logo accommodation portion 4*a* for the planting or transcription of the first logo 12*a* formed on the upper portion thereof and a second logo accommodation portion 4*b* for the planting or transcription of the second logo 14*a* formed on the lower portion thereof. The first logo accommodation portion 4*a* is composed of empty spaces consisting thin channels penetrating the plate 4 to form the "kate spade," and the second logo accommodation portion 4*b* is composed of spaces consisting of two empty rectangular channels instead of the letters "NEW YORK" and an empty space in the shape of a spade. That is, the shape of each of the logo accommodation portions may vary depending on the size and arrangement of the logo. For example, the logo accommodation portion may be appropriately formed as spaces corresponding to respective letters or as a small space accommodating a letter string composed of a plurality of small letters.

Each of the channels or spaces constituting the first logo accommodation portion 4*a* needs to have the same size as or a slightly smaller size than each of the letters "k," "a," "t," "e," "s," "p," "a," "d," and "e" of the first logo 12. In the same manner, each of the three spaces constituting the second logo accommodation portion 4*b* needs to be equal to or slightly smaller than each of the spaces formed by the character strings "NEW" and "YORK" and the shape "♠." Otherwise, in the coupling process to be described later, the first logo 12*a* and the second logo 14*a* are not coupled to the plate 4 securely, and pass through the spaces of the logo accommodation portions or are loosely coupled to the plate 4, so that subsequent processes become difficult and the probability that a defect occurs increases.

Figure 4B:
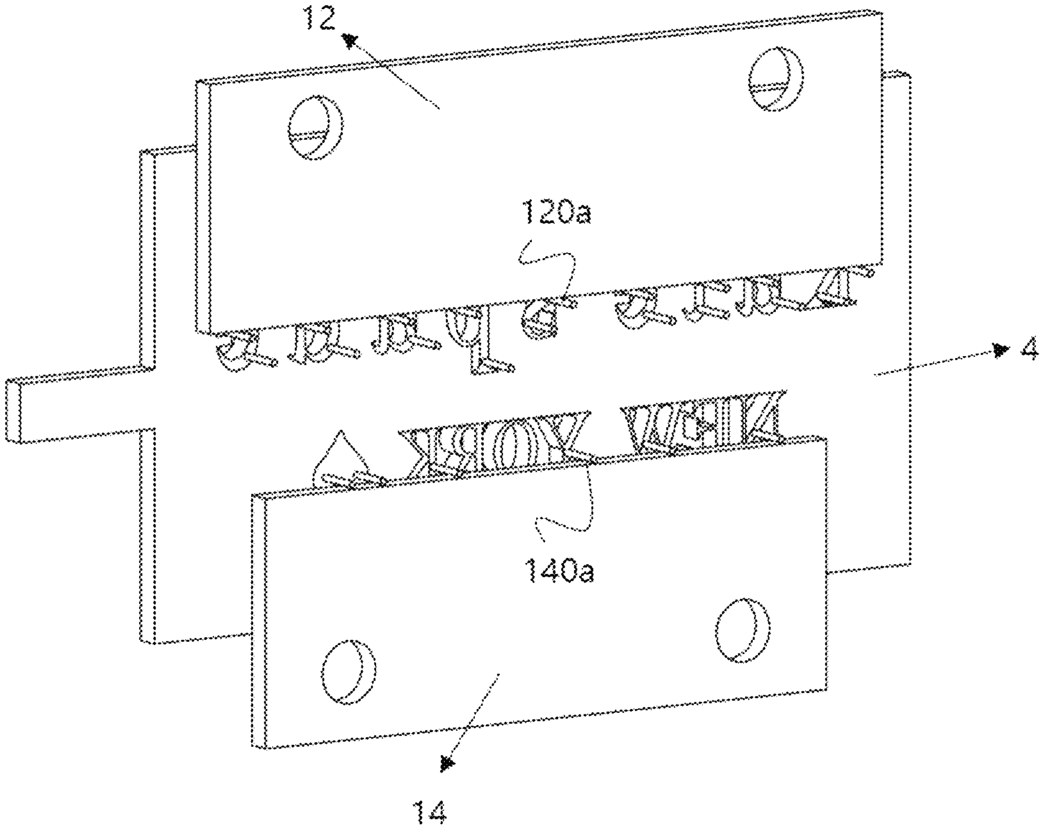
FIG. 4*b* is a view of the rear surface of the plate showing the temporary coupling of the first base decoration and the second base decoration to the plate of the present invention.

FIG. 4*b* is a view of the rear surface of the plate 4 showing the temporary coupling of the first base decoration 12 and the second base decoration 14 to the plate 4 of the present invention. An operator aligns and then inserts the first logo 12*a* with and into the first logo accommodation portion 4*a* and the second logo 14*a* with and into the second logo accommodation portion 4*b* manually or using an arm of an automated NC machine, thereby temporarily coupling the two members to each other. The plate 4 is preferably manufactured in a size that accommodates the first and second logos 12*a* and 14*a* as well as the first and second base decorations 12 and 14, which are base materials to which the first and second logos 12*a* and 14*a* are attached. In this state, the first and second fins 120*a* and 140*a* are erected and exposed upward.

Next, a coupling process using the plate 4 of FIG. 4 will be described. The coupling process may be considered to be a process of integrating, transcribing, or transplanting the first logo 12*a* and the second logo 14*a*, constituting the theme of the metal decoration, onto the plate 4.

Figure 5:
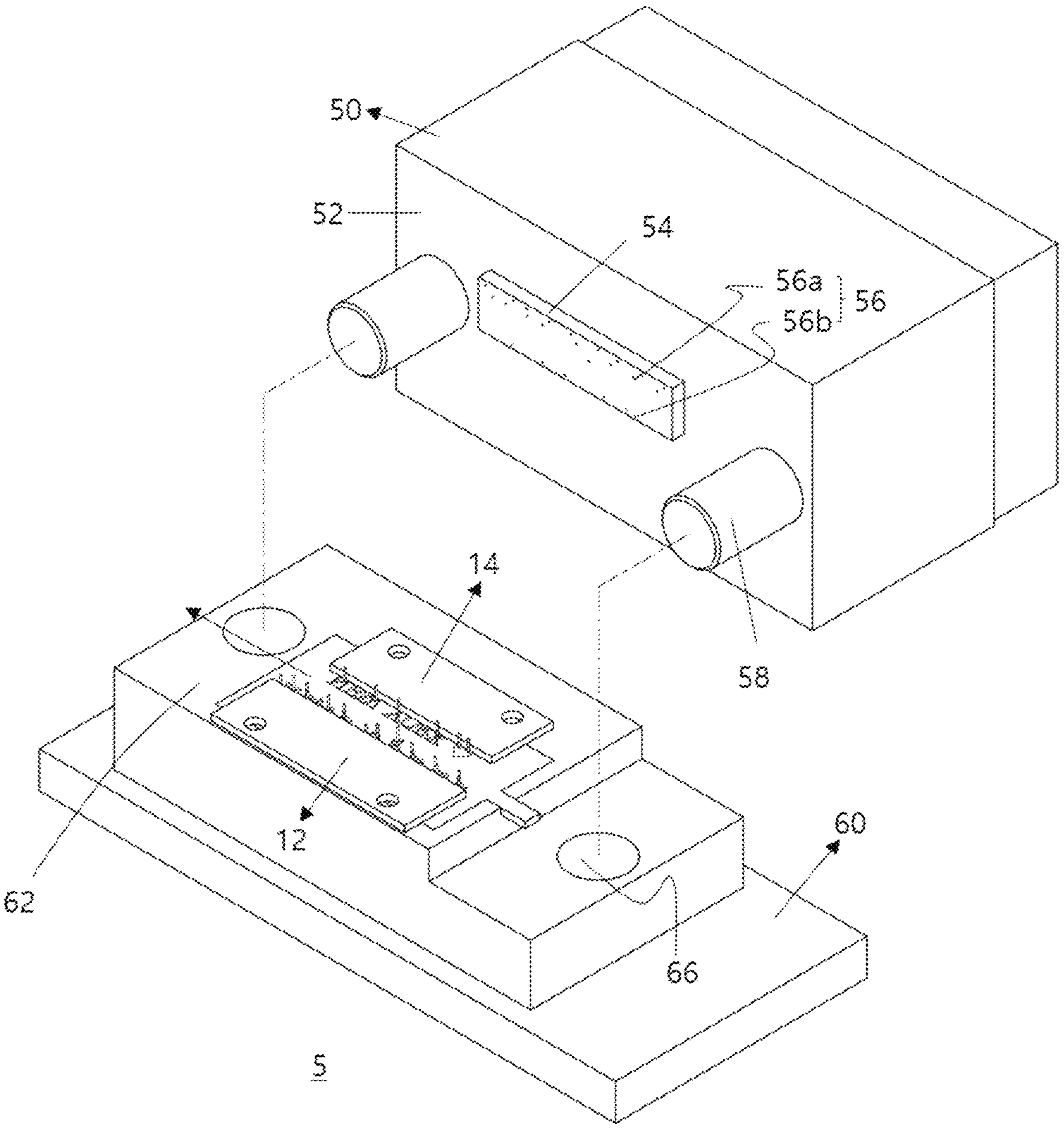
FIG. 5 is a perspective view showing a press machine for performing the coupling process of the present invention.

FIG. 5 is a perspective view showing a press machine 5 for performing the coupling process of the present invention.

The press machine 5 includes an upper press part 50 and a lower worktable 60.

As shown in the bottom surface of the press part 50, a protruding rectangular pressing portion 54 is formed on the bottom surface formed of a flat base 52. Pinholes 56 are formed in the pressing portion 54. The pinholes 56 are drilled in two rows in the illustrated example. The upper pinholes 56*a* are intended to accommodate the first pins 120*a*, and the lower pinholes 56*b* are intended to accommodate the second pins 140*a*. Accordingly, the interval and arrangement of the pinholes 56 need to be formed to match those of the first and second pins 120*a* and 140*a*. It is preferable that the diameter of the pin holes 56 is at least equal to or slightly larger than that of the pins in order to tightly accommodate the pins. Rods 58 each extending in a circular column shape are formed on both sides of the pressing portion 54.

In the worktable 60, the plate 4 coupled with the decoration logos is seated in a mounting groove depressed into a support surface 62. Accommodation holes 66 configured to accommodate the rods 58 are formed long on both sides of the mounting groove.

The plate 4 of the present invention is seated in the mounting groove with the bottom surface of FIG. 4*b* facing upward.

When an operator operates the press machine 5, the press part 50 descends, so that the first and second pins 120*a* and 140*a* are closely inserted into the respective pinholes 56 of the pressing portion 54 and then the flat surface of the pressing portion 54 presses the first and second base decorations 12 and 14. Accordingly, the first logo 12*a* is inserted and fixed into the first logo accommodation portion 4*a*, and the second logo 14*a* is inserted and fixed into the second logo accommodation portion 4*b*. In this section, the term "fixed" means that the first and second logos 12*a* and 14*a* are pressed into the first and second logo accommodation portions 4*a* and 4*b* in a temporarily coupled state and, thus, are not separated therefrom or are not deformed therein unless a large force is applied. The term "fixed" does not mean that the first and second logos 12*a* and 14*a* are permanently imprinted on the plate. During this process, the rods 58 are inserted into the accommodation holes 66. The accommodation holes 66 may allow the pressing portion 54 to transmit force evenly while moving downward without shaking through the guidance of the rods 58, and may also serve as stoppers.

When the coupling process is completed through the above operations, the operator collects the plate 4 to which the first and second logos 12*a* and 14*a* are fixed. The square border forming the outer edge of the pressing portion 54 may press the periphery of the logos of the first and second base decorations 12 and 14 to allow easy separation. Accordingly, the operator manually separates the remaining portions excluding the first and second logos 12*a* and 14*a*.

Figure 6:
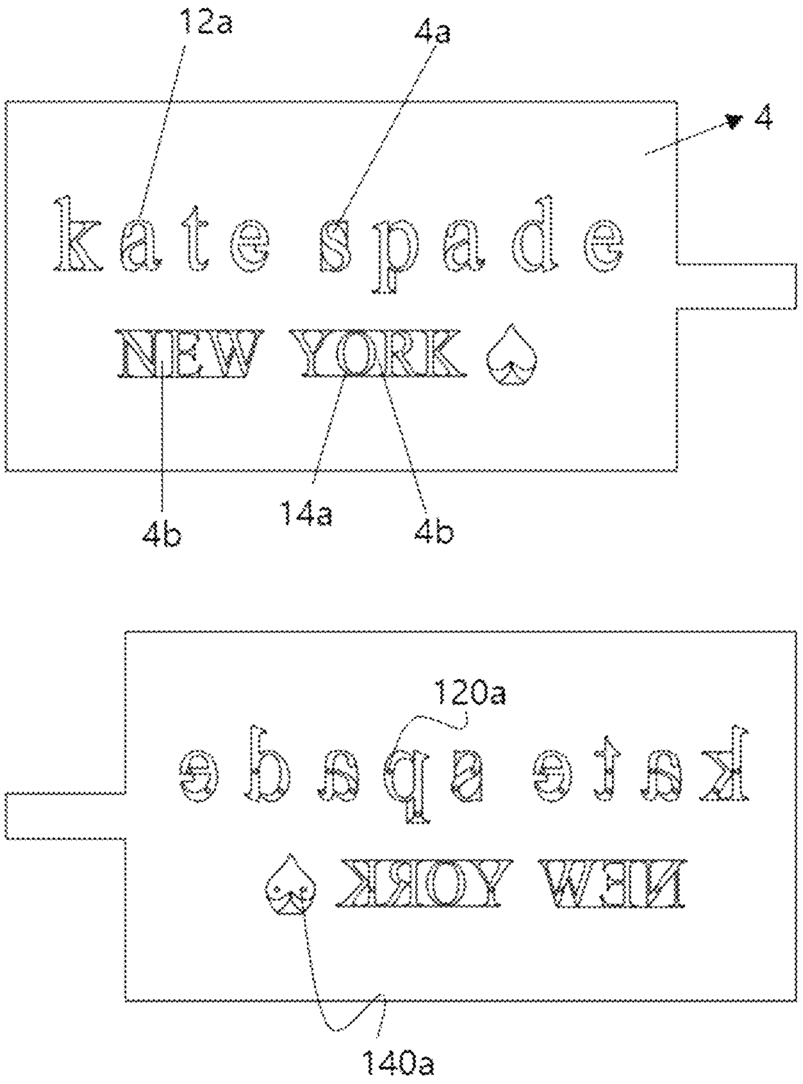
FIG. 6 shows the front and bottom surfaces of a plate after a coupling process.

FIG. 6 shows the front and bottom surfaces of the plate 4 after the above coupling process. The first and second pins 120*a* and 140*a* of the first and second logos 12*a* and 14*a* are maintained without being damaged or separated.

The "plate" of the present invention may be manufactured in a curved shape or other three-dimensional shapes, regardless of the term, as long as the first and second logos 12*a* and 14*a* can be planted thereonto. Although plastic is suitable for the material of the plate 4, the material is not limited thereto.

The intermediate finished product of FIG. 6 is now "permanently" fixed to rubber, i.e., a material of a handbag, through a final imprinting process.

Figure 7:
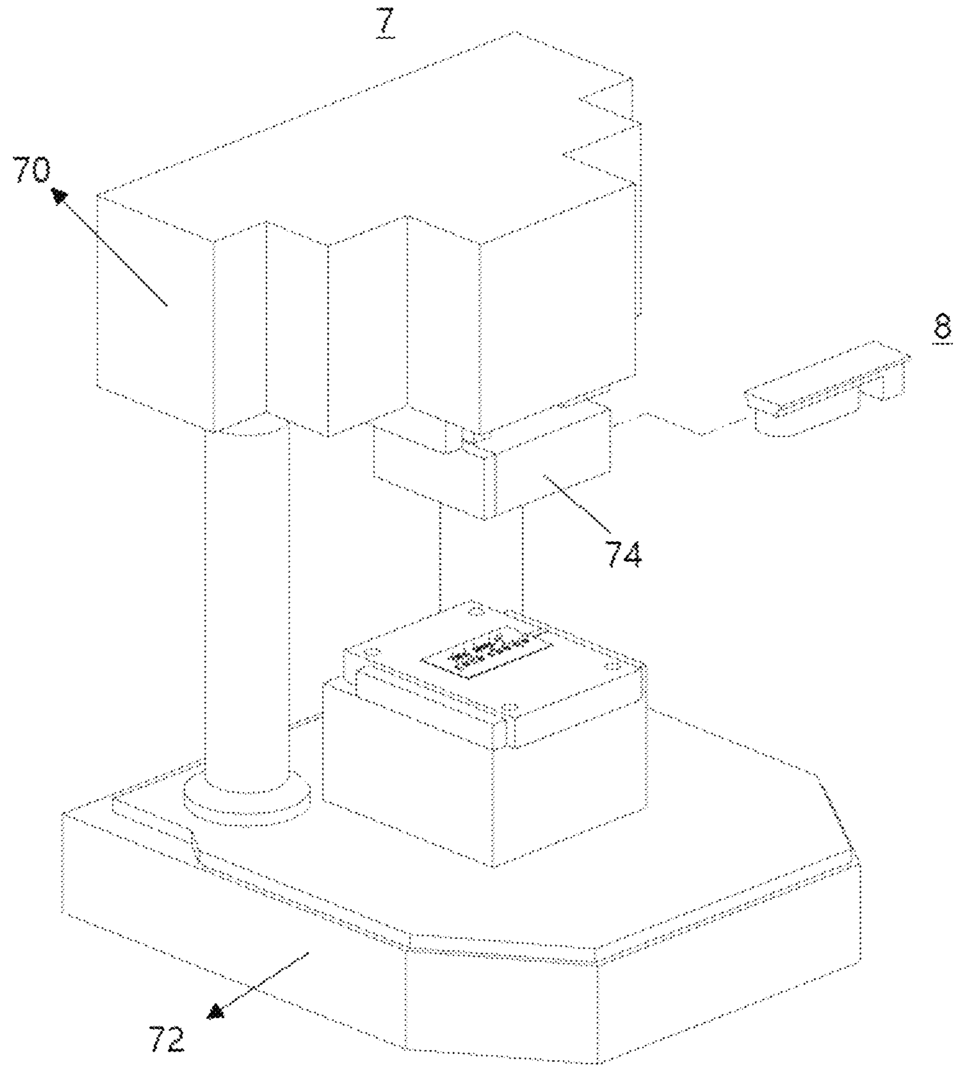
FIG. 7 is a perspective view of a setting press machine.

FIG. 7 is a perspective view of a setting press machine 7 that performs the final imprinting process. The setting press machine 7 includes an upper setting press part 70 and a lower setting worktable 72.

The setting press part 70 includes a setting pressing portion 74 into which an assembly body 8 is inserted.

Figure 8:
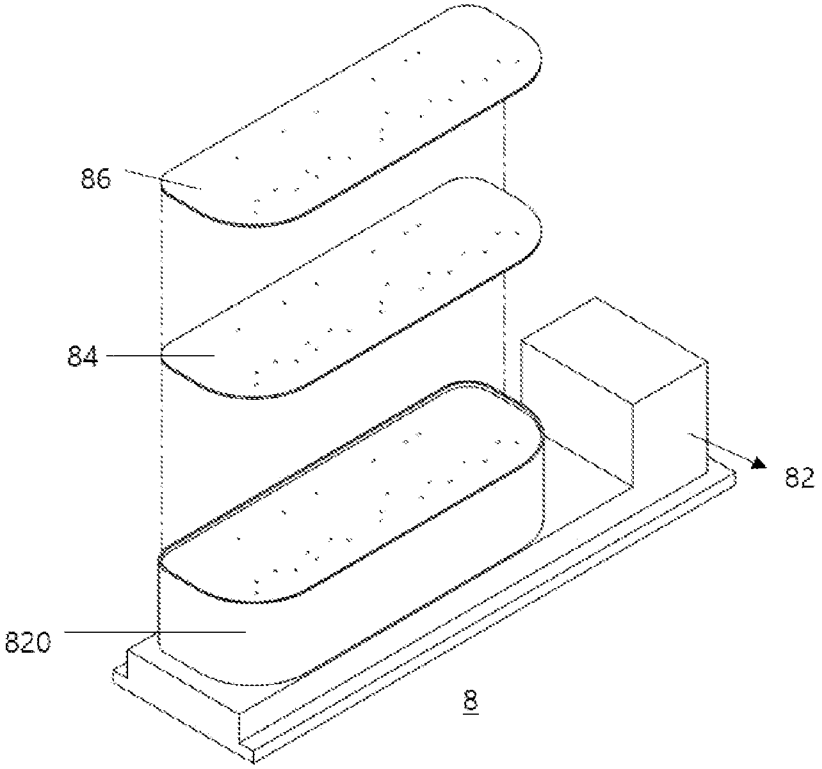
FIG. 8 is an exploded perspective view of an assembly according to the present invention.

The assembly 8 includes a mold frame 82, as shown in FIG. 8. A support mold 820 having respective pin holes configured to accommodate the first and second pins 120*a* and 140*a* is formed on the mold frame 82. A first elastic washer 84 and a second elastic washer 86 having the same plan-view shape as the support mold 820 are inserted into the support mold 820. The assembly 8 is inserted into the setting pressing portion 74 so that the second elastic washer 86 faces the bottom surface, i.e., the setting worktable 72.

The plate 4 is placed on the setting worktable 72 so that the bottom surface of the plate 4 faces upward and the first and second pins 120*a* and 140*a* are accurately aligned with the respective pin holes of the support mold 820 and the first and second elastic washers 84 and 86 exactly in the vertical directions. A mounting groove (not shown) is formed in the setting worktable 72, and the plate 4 is placed therein. A lower support portion embossed with shapes corresponding to the first and second logos 12*a* and 14*a* is formed in the mounting groove in advance.

Then, a raw material constituting a material of a handbag or the like, for example, rubber, which is leather, is placed on the plate 4. In this state, when the setting press machine 7 is operated, the setting pressing portion 74 descends and presses the bottom surface of the plate 4. In this case, the first and second logos 12*a* and 14*a* coupled to the plate 4 are imprinted on the rubber as if they were printed on the rubber by the reaction force of a lower support portion. That is, the first and second logos 12*a* and 14*a* are transcribed from the plate 4 to the rubber. Furthermore, the first and second elastic washers 84 and 86 are separated from the mold frame 82 and attached to the opposite surface of the rubber. The protruding first and second fins 120*a* and 140*a* are finished as a flat surface with silicone.

In the state where the first and second logos 12*a* and 14*a* are imprinted on the rubber, the plate 4 is in a state identical to a state in which it is temporarily separated from the rubber, so that the operator can easily remove the plate 4 from the rubber. This completes a final product imprinted with the metal decoration of the present invention.

Figure 9:
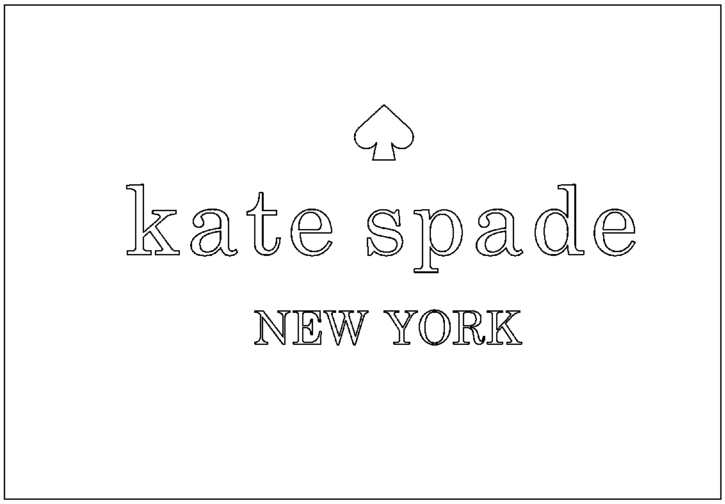
FIG. 9 shows a rubber imprinted with the logos of the present invention.

FIG. 9 shows a rubber imprinted with the logos of the present invention, and is the same as described above except that the spade shape is located at the center of the upper portion.

Figure 1:
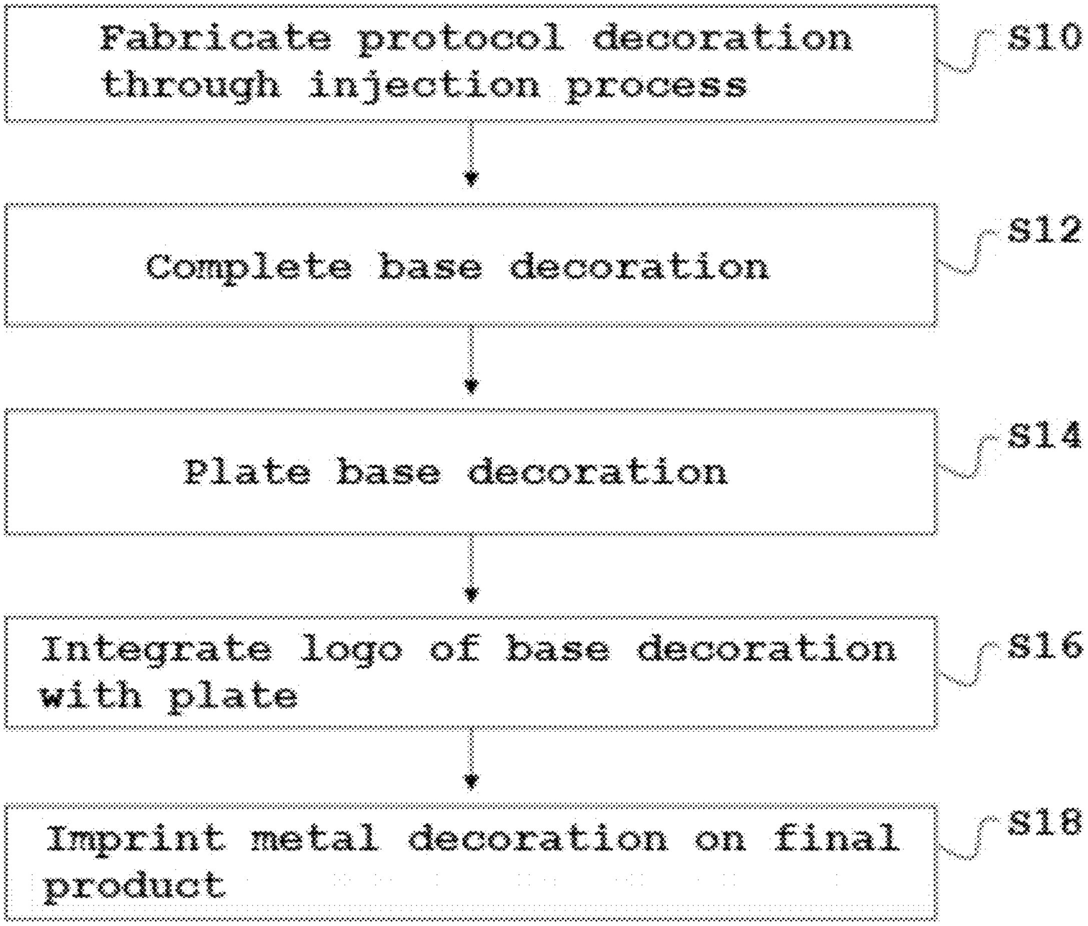
FIG. 1 is a view showing the overall process of a metal decoration manufacturing method according to the present invention.

A method for manufacturing a metal decoration is described by synthesizing the individual steps of the present invention described above with reference to the process diagram of FIG. 1, as follows;

First, a protocol decoration is fabricated through an injection process in step S10.

Thereafter, base decorations are provided by removing unnecessary portions from the protocol decoration in step S12.

Thereafter, the base decorations are plated in step S14.

Thereafter, the logos of the base decorations are integrated with a plate by coupling the logos of the base decorations with the plate through a coupling process in step S16.

Thereafter, the logos of the plate to which the logos are coupled are imprinted and fixed onto a material, to which a metal decoration will be finally fixed, through a final imprinting process in step S18.

Figure 10:
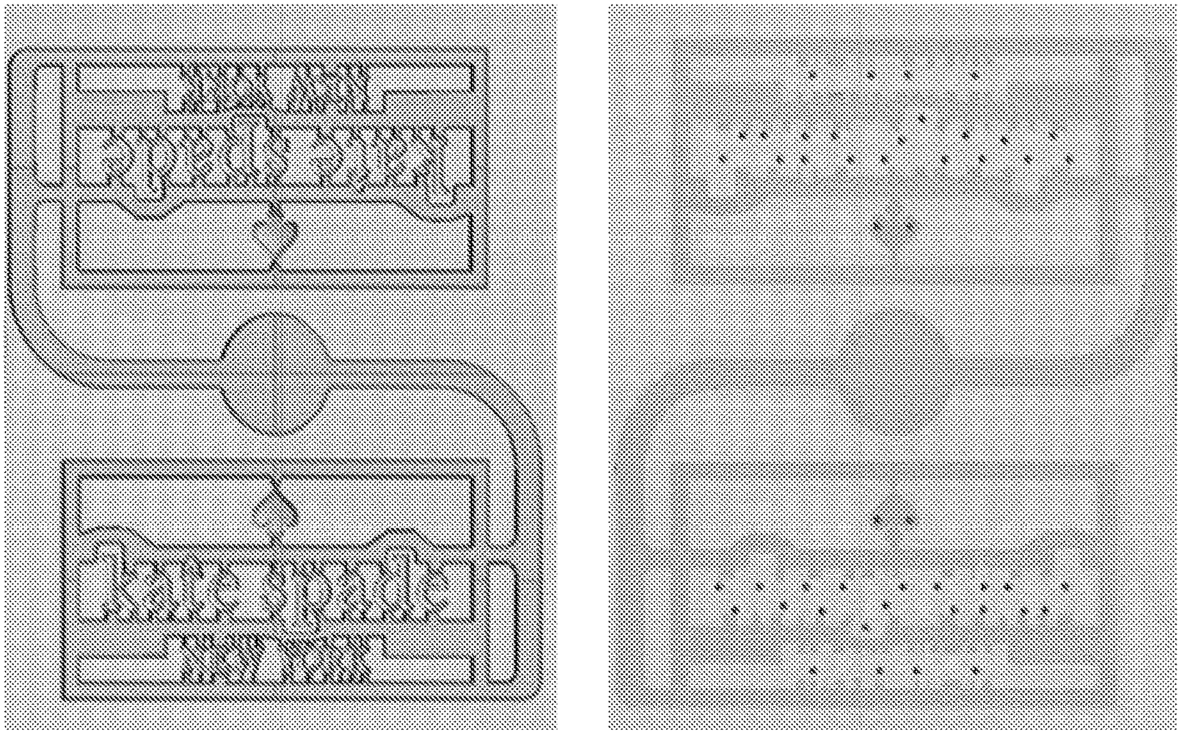
FIG. 10 shows a protocol decoration according to another embodiment of the present invention.
Figure 11:
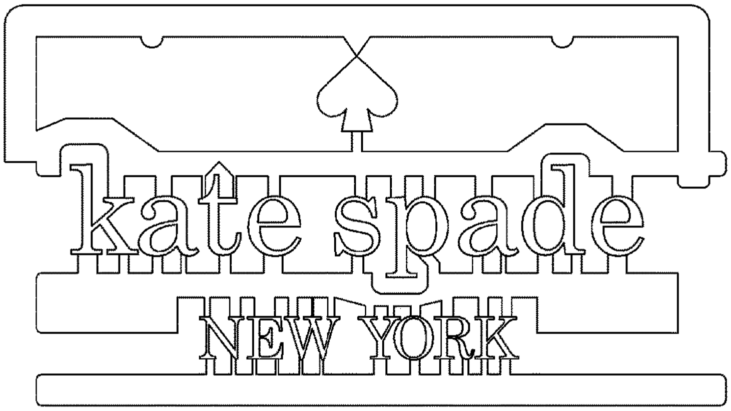
FIG. 11 shows base decorations that are separated from the protocol decoration of FIG. 10 and then plated.

FIG. 10 shows a protocol decoration according to another embodiment of the present invention, and FIG. 11 shows base decorations that are separated from the protocol decoration of FIG. 10 and then plated. In FIG. 10, the left drawing shows the front surface of the protocol decoration, and the right drawing shows the rear surface of the protocol decoration.

The protocol decoration 10 includes two base decorations, which are identical to each other. Each of the base decorations includes "kate spade," "NEW YORK," and a spade shape. In this case, it will be understood that the operation time can be reduced compared to the above-described embodiment.

The preferred embodiments of the present invention have been described above. The gist of the present invention lies in the fact that any logo composed of one or more letters or shapes can be easily and accurately integrated by coupling the logo with a plate, which is an intermediate medium. The present invention is useful when a logo is composed of only one letter or shape, as well as when it is composed of two or more letters or shapes. It will be understood that the present invention is more useful when it is composed of a combination of a long string and a shape, as in the embodiment of the present invention.

Similarly, in the present invention, the same description is applied to a case where there is one base decoration as well as a case where there are three or more base decorations, and the same effects can be expected.

The metal decoration to be imprinted may include one or more letters, characters, shapes and/or symbols, and may be formed into various three-dimensional shapes, such as a curved shape and a protrusion-depression shape, as well as a flat plate shape.

According to the present invention, there are provided the effects of easily and economically manufacturing a metal decoration, reducing work man-hours, and improving manufacturing efficiency.

What is claimed is:

1. A metal decoration manufacturing method comprising:

manufacturing a protocol decoration through an injection process;

providing a base decoration by removing unnecessary portions from the protocol decoration;

plating the base decoration;

integrating a logo of the base decoration with a plate by coupling the logo of the base decoration to the plate through a coupling process wherein the plate includes a logo accommodation portion configured to accommodate the logo of the base decoration; and imprinting and fixing the logo coupled to the plate onto a final fixation target material through a final imprinting process, wherein the logo includes at least two letters or shapes, and the at least two letters or shapes are simultaneously coupled to the plate, wherein the base decoration includes a first base decoration and a second base decoration, the logo includes a first logo of the first base decoration and a second logo of the second base decoration, and the logo accommodation portion of the plate includes a first logo accommodation portion to which the first logo is coupled and a second logo accommodation portion to which the second logo is coupled, wherein one or more pins are formed on a rear surface of the logo of the base decoration, wherein the final imprinting process comprises:

placing the plate on a lower setting worktable of a setting press machine such that a bottom surface of the plate faces upward and the logo coupled to the plate faces downward, the setting press machine comprising an upper setting press part including a setting pressing portion into which an assembly body is inserted and the lower setting worktable;

placing the final fixation target material on the plate placed on the lower setting worktable;

inserting at least one washer into a support mold of the assembly body, both the at least one washer and the support mold having respective pin holes configured to accommodate the one or more pins;

fixing the logo coupled to the plate onto a surface of the final fixation target material by descending the setting pressing portion and then pressing the bottom surface of the plate;

fixing the at least one washer onto an opposite surface of the final fixation target material; and separating and removing the plate from the final fixation target material.

2. The metal decoration manufacturing method of claim 1, wherein the coupling process is performed by a press machine, the press machine includes an upper press part and a lower worktable, and one or more pin holes configured to accommodate the pins of the logo are formed in a pressing portion on a bottom surface of the pressing portion.

* * * * *